United States Patent
Liu et al.

(10) Patent No.: US 7,486,442 B2
(45) Date of Patent: Feb. 3, 2009

(54) POLARIZER PROTECTIVE FILM, POLARIZING PLATE, AND VISUAL DISPLAY

(75) Inventors: Jong-Min Liu, Hsinchu (TW); Shih-Ming Chen, Hsinchu (TW); Young-Jen Lee, Changhua (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 52 days.

(21) Appl. No.: 10/954,824

(22) Filed: Sep. 30, 2004

(65) Prior Publication Data

US 2006/0066946 A1 Mar. 30, 2006

(51) Int. Cl.
*G02B 5/30* (2006.01)
(52) U.S. Cl. .......................... 359/494; 349/96; 428/323
(58) Field of Classification Search ........................ None
See application file for complete search history.

(56) References Cited

U.S. PATENT DOCUMENTS

| | | | |
|---|---|---|---|
| 6,630,970 B2* | 10/2003 | Trapani et al. ................. | 349/96 |
| 6,757,102 B2 | 6/2004 | Nishida et al. .............. | 359/491 |
| 2002/0018883 A1* | 2/2002 | Okazaki et al. ............. | 428/220 |
| 2002/0192397 A1* | 12/2002 | Tsujimoto ................... | 428/1.31 |
| 2003/0063237 A1 | 4/2003 | Okada et al. .................. | 349/96 |
| 2003/0123151 A1* | 7/2003 | Matsunaga et al. ........... | 359/599 |
| 2003/0137732 A1* | 7/2003 | Sugino et al. ................ | 359/491 |
| 2003/0151706 A1* | 8/2003 | Sugino et al. ................. | 349/96 |
| 2003/0151707 A1* | 8/2003 | Kobayashi et al. ............ | 349/96 |
| 2003/0202137 A1* | 10/2003 | Nakamura et al. ............ | 349/96 |
| 2003/0224113 A1 | 12/2003 | Nakamura et al. ........ | 427/372.2 |
| 2004/0066556 A1* | 4/2004 | Dontula et al. .............. | 359/599 |
| 2004/0071937 A1* | 4/2004 | Chien et al. ................. | 428/143 |
| 2006/0007371 A1* | 1/2006 | Miyatake et al. ............. | 349/96 |

FOREIGN PATENT DOCUMENTS

| | | |
|---|---|---|
| JP | 2001-066432 | 3/2001 |
| JP | 2002-328223 | 11/2002 |
| JP | 2002-341137 | 11/2002 |
| JP | 2003-185833 | 7/2003 |
| JP | 2004-053801 | 2/2004 |
| JP | 2004-045893 | 12/2004 |
| WO | WO 03/093882 | 11/2003 |

* cited by examiner

*Primary Examiner*—Arnel C Lavarias
(74) *Attorney, Agent, or Firm*—Thomas, Kayden, Horstemeyer & Risley

(57) ABSTRACT

A protective film for a polarizer. An exemplary polarizer protective film includes a transparent resin with nanoscale particles dispersed therein, having an average diameter not exceeding 50 nanometers.

19 Claims, 2 Drawing Sheets

POLARIZER PROTECTIVE FILM, POLARIZING PLATE, AND VISUAL DISPLAY

BACKGROUND

The present invention relates to a protective film for a polarizer, and a polarizing plate, and a visual display using the polarizing plate concerned.

A polarizing plate used for displays, such as liquid crystal display, is a laminated product of a polarizer having a polarization function and a protective film for securing its durability and mechanical strength with the interposition of an adhesive.

The polarization function of the polarizer is obtained by orienting a light anisotropic absorber in a transparent polymer film. For example, a PVA-based polarizer is obtained by allowing iodine or a dichromatic dye to be absorbed on polyvinyl alcohol (PVA) film, followed by uniaxial orientation by stretching. In such a polarizing plate, if moisture permeability of the polarizer protective film is high, dissociation of PVA or iodine ion in the polarizer can affect polarizing performance.

Although triacetyl cellulose (TAC) films are generally used as polarizer protective film from the viewpoint of transparency, appearance, and easy adhesion to the polarizer, the moisture permeability thereof (about 300 g/m$^2$/24 hours) may be insufficient to protect the polarizer in high humidity, especially as application fields of viewing displays become wider, and requirements for polarizing plates become more severe as a result.

In addition, hard coat processing is commonly applied for the purpose of protecting the surface of the polarizing plate. This hard coat layer is typically formed by a method in which a curable coated film with high hardness is added on the surface of the protective film. It would be advantageous to provide a protective film with sufficient hardness to eliminate the requirement for a hard coat layer.

SUMMARY

The invention relates to a protective film for a polarizer. An exemplary embodiment of a polarizer protective film comprises a transparent resin with nanoscale particles dispersed therein, wherein the nanoscale particles have an average diameter not exceeding 50 nm.

The invention also relates to a polarizing plate. An exemplary embodiment of a polarizing plate comprises a polarizer with the above described protective film on at least one surface thereof.

Furthermore, the invention relates to a visual display using the above described polarizing plate.

REFERENCE NUMERALS IN THE DRAWINGS

| 10  | composite material    | 10a | transparent resin   |
| --- | --------------------- | --- | ------------------- |
| 10b | nanoscale particle    | 12  | mixing tank         |
| 13  | coating device        | 14  | support sheet       |
| 15  | driving roller        | 16  | curing device       |
| 17  | take up roller        | 18  | coated film         |
| 5   | polarizer             | 20  | protective film     |
| 30  | polarizing plate      | 40  | liquid crystal cell |
| 50  | liquid crystal display|     |                     |

DETAILED DESCRIPTION

A polarizer protective film will be described here in greater detail. Some embodiments of the invention, such as the exemplary embodiments described, can potentially provide a protective film with reduced moisture permeability, thereby providing a highly durable polarizing plate. Some embodiments of the protective film also potentially provide superior hardness which may eliminate the need for a hard coat layer on the polarizing plate. The above and other advantages may be accomplished by using a nanocomposite material as the protective film for polarizer.

Figure 1:
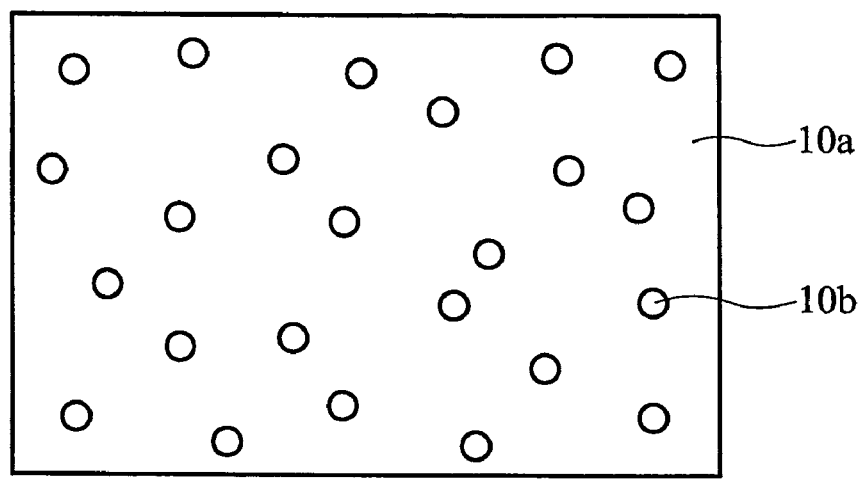
FIG. 1 is a schematic view of an embodiment of a protective film for polarizer.

Referring now to the drawings, FIG. 1 is a schematic view of an embodiment of a polarizer protective film. As shown in FIG. 1, the protective film 10 is a composite comprising a transparent resin 10a with nanoscale particles 10b dispersed therein. Incorporation of the nanoscale particle may provide increased hardness, dimension stability, heat resistance, and reduced moisture permeability. Furthermore, in some embodiments, other performance characteristics required for a polarizer protective film such as no birefringence, low optical retardation, and good adhesion to polarizer, are not compromised.

The transparent resins used herein preferably provide transmittance of not less than 90%, and more preferably comprises a cross-linked structure so as to give a composite film that is optically isotropic and has no birefringence, and low optical retardation (preferably below 5 nm). Suitable transparent resins include but are not limited to epoxy resins and acrylic resins. Epoxy resins include resins comprising monomers, oligomers, and polymers containing one or more oxirane rings. Representative examples of suitable epoxy resins include bisphenol A epoxy resins, bisphenol F epoxy resins, bisphenol S epoxy resins, phenol-novolak epoxy resins, cresol-novolak epoxy resins, hydrogenated or nitrogen-containing naphthalene type epoxy resins, biphenol type epoxy resins, and alicyclic epoxy resins. These resins may be used singly or as a mixture of two or more, depending upon the specific application needs. Suitable acrylic resins include those in forms of monomers, oligomers, or polymers. Representative examples include epoxy acrylate, polyamino methacrylate, polyester acrylate, 1,6-hexanediol diacrylate (HDDA), and hydroxyethyl methacrylate (HEMA). Likewise, these acrylic resins may be used singly or as a mixture of two or more, or even in combination with the above-mentioned epoxy resins. Preferably, the resins used herein have a glass transition temperature between about 100-200° C. due to processing considerations.

Additionally, curing agents conventionally used in the art, such as UV curing agents, thermal curing agents, or combinations thereof, may be added in an effective amount to cure the resin. The frequently used thermal curing agents for epoxy resins include anhydrides such as hexahydrophthalic anhydride (HHPA), tetrahydrophthalic anhydride (THPA), methyl tetrahydrophthalic anhydride (MTHPA), and methylhexahydrophthalic anhydride (MHHPA); triethylene diamine (TEDA); imidazoles such as 2-ethyl-4-methylimidazole, and 2-methylimidazole; phosphines such as triphenylphosphine, tetraphenylphosphonium tetrapenylborate, and o-diethylphosphorodithioate; and tetra-ammonium salts. UV curing agents for epoxy resins include but are not limited to cationic photoinitiators such as triaryl sulphonium hexafluoro antimonite, triaryl sulphonium hexafluoro phosphate and diaryl indonium salt. Preferable UV curing agents for acrylic resins include free radical initiators such as ketone initiators, phosphine initiators, and amine synergist.

The materials of the nanoscale particles are not specifically limited, as long as the size thereof is sufficiently small to provide high transmittance of the composite film. Preferably, the nanoscale particles have an average diameter not exceeding 50 nanometers, and more preferably between about 5-20 nanometers so as to give a film with a transmittance of not less than 90%. Examples of suitable nanoscale particles include but are not limited to particles of silica, and metal oxides such as $TiO_2$, $ZrO_2$, $Al_2O_3$, ZnO, MgO, or the like. A mixture of the above is also suitable for use.

It is preferable that the nanoscale particles have a thermal expansion coefficient lower than that of the transparent resin. As such, the resulting composite has a lower thermal expansion coefficient compared with counterparts in absence of the nanoscale particles, and thereby an improved dimensional stability and planarity may be obtained. It is also preferable that the nanoscale particles have a high hardness. For example, the above exemplary nanoscale particles generally have a very high hardness which renders the composite an increased hardness. In some cases where the pencil hardness is 3H or larger, a hard coat layer protecting the surface of the polarizing plate can be saved.

The nanoscale particles are preferably present in an amount of about 5-50% by weight, based on the weight of the polarizer protective film. It is found that the transmittance of the film is not seriously affected by the amount of the particles as long as they are sufficiently small. Accordingly, the amount of the nanoscale particle may exceed 50% by weight although less preferable. Commercially available nanoscale particles include those in powder forms or in liquid suspension, all of which are suitable for use herein.

Furthermore, known antioxidants and ultraviolet absorbers can be incorporated, either alone or in combination, in order to prevent deterioration of the protective film, and to improve reliability after formation of the polarizing plate. These antioxidants and ultraviolet absorbers are added usually in an amount of 0.1-3% by weight, based on the weight of the protective film.

Figure 2:
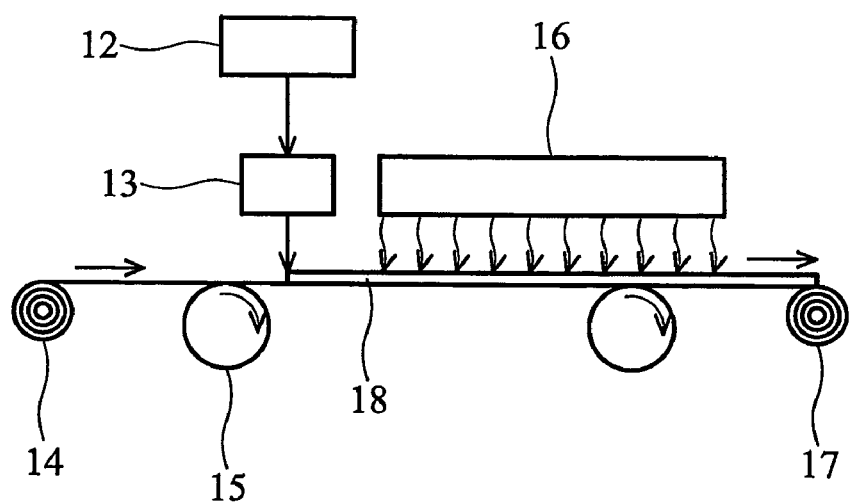
FIG. 2 is an example of an apparatus for fabricating the protective film.

Referring now to the drawings, FIG. 2 is an example of an apparatus for fabricating the protective film. Starting materials including nanoscale particles, resins, curing agents, and so on are added to a blend tank 12 and thoroughly mixed into a slurry. According to the invention, the slurry can be non-solvent (100 wt % solid content), or solvent-containing with a solid content of not less than 40 wt %. Preferably, the slurry mixture has viscosity between 200-6000 cp to facilitate the subsequent coating. The slurry mixture is fed into a coating device 13 and coated onto a releasable support sheet 14 unwound by a driving roller 15 and continuously carried at a fixed speed of, for example, about 0.5-10 m/min. The coated film 18 is subsequently cured when passing through a UV- or heat-curing device 16 to give the desired film, which is then rolled onto a take-up roller 17.

The releasable support sheet 14 may be formed of stainless steel or thermal plastic polymers such as carbamate resins, acrylic resins, polyester resins, poly vinyl alcohols, ethylene-vinyl alcohol copolymers, vinyl chloride resins, polyvinylidene chloride resins, polynorbornene resins, polycarbonate resins, and polyarylate resins. The thickness of the polarizer protective film is preferably between 10-100 μm, and more preferably 20-80 μm.

Figure 3:
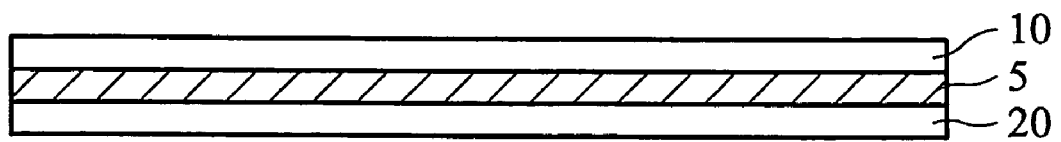
FIG. 3 is a schematic view of an embodiment of a polarizing plate utilizing the protective film of FIG. 1.

FIG. 3 is a schematic view of an embodiment of a polarizing plate utilizing the protective film 10 of FIG. 1. As shown in FIG. 3, the polarizing plate 30 comprises a polarizer 5 sandwiched between a first protective film 10 and a second protective film 20. The composite protective film of the invention may be employed on one or each of opposite surfaces of the polarizer 5. Accordingly, the second protective film 20 is preferably the same as the composite protective film 10 of FIG. 1, or it can be conventional protective films such as cellulose ester series film, polycarbonate film, acryl series film, polyester series film, polyolefin series film, and norbornane series film. There is no particular limitation on the polarizer 5 which can be used in the invention, as long as it has a function as a polarizer. Examples thereof include PVA-based or polyene-based polarizer.

In such a polarizing plate 30, if moisture permeability of polarizer protective film 10 is high, polarizing capability of the polarizer 5 can deteriorate. By employing the composite protective film 10 of the invention, it is possible to improve the optical durability of the polarizing plate, especially in high humidity. In some embodiments, the composite protective film 10 may have a low moisture permeability of 20 $g/m^2/24$ hours or less.

The polarizing plate 30 is formed by laminating the protective film 10 of the invention with the above-mentioned polarizer 5 on at least one surface thereof. For example, the polarizer and the protective film 10 can be adhered by use of transparent adhesive or a pressure-sensitive adhesive. In addition, a primer layer (under coating layer) of polyurethane or the like may be provided on the protective film to enhance the adherence between the protective film and the adhesive. Furthermore, surface treatment such as corona or plasma treatment of the protective film is preferably conducted before the lamination, whereby the surface thereof can be rendered hydrophilic to facilitate adhesion thereof to a polarizer. It is preferable that after surface treatment, the contact angle of distilled water on the surface of the protective film is not more than 15°.

A polarizing plate of the invention may be used in practical use as an optical film laminated with other optical layers. One or more optical layers such as a reflective plate, a transflective plate, a retardation plate (a half wavelength plate and a quarter wavelength plate included), and a viewing angle compensation film, may be used. Especially preferable are a reflection type polarizing plate or a transflective type polarizing plate in which a reflective plate or a transflective reflective plate is further laminated onto a polarizing plate of the invention; an elliptically polarizing plate or circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

Figure 4:
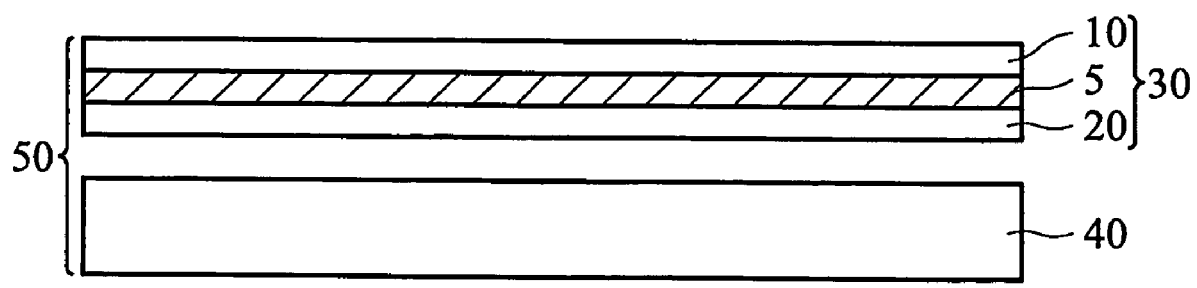
FIG. 4 is a schematic view of an embodiment of a visual display utilizing the polarizing plate of FIG. 3.

The polarizing plate of the invention may be used in manufacturing various visual displays such as liquid crystal displays, organic electro luminescence (organic EL) displays, and plasma display panel (PDP). For example, as shown FIG. 4, the liquid-crystal display device 50 can be formed by arrangement of the polarizing plate 30 according to the invention on one or each of opposite surfaces of a liquid-crystal cell 40. There is no particular limitation in the kind of the liquid-crystal cell or the method of driving the liquid-crystal cell. A suitable cell such as a TN (Twisted Nematic) liquid-crystal cell, a vertically aligned cell, or an IPS (in-plane-switch) cell may be used as the liquid-crystal cell. In addition, in assembling a liquid crystal display, suitable parts, such as a diffusion plate, prism array, lens array sheet, optical diffusion plate and backlight, may be installed in suitable position.

The following specific examples are intended to demonstrate the invention more fully without acting as a limitation upon its scope, since numerous modifications and variations will be apparent to those skilled in this art.

In all of the following examples, a MEK (methyl ethyl ketone) silica sol available from Nissan Chemical under the tradename "MEK-ST" was used as nanoscale particles source, and the amount thereof was controlled at about 20%, based on the total weight of the composition.

EXAMPLES 1-9

In a MEK silica sol, three cationic photoinitiators including Photoinitiator 552 (diaryl indonium salt, Ciba-Geigy), UVI-6976 (triaryl sulfonium salt, Dow Chemical), and UVI-6992 (triaryl sulfonium salt, Dow Chemical) were dissolved, and epoxy resins Union Carbide 4221E (Union Carbide) and Shell Epon 828 (Shell Chemical) were added to produce a slurry. The slurry was baked in a vacuum oven to remove solvent to achieve desirable viscosity, and coated onto a Zeonor/glass substrate using a 100 μm blade. The coated film was cured by UV radiation with an energy of about 1.5 J/cm$^2$ and a conveyor belt speed of 4 m/min. It was found that a single round of radiation was sufficient to provide a tacky-free film.

The starting materials and amounts thereof used in Examples 1-9 are listed in Table 1 below.

TABLE 1

| Example | Union Carbide 4221E/Shell Epon 828 | Initiators | Initiator Ratios (552/UVI-6976/UVI-6992) | MEK sol |
|---|---|---|---|---|
| 1 | 11 g/5 g | 2.5 phr (0.4 g) | 1/2/1 (0.1/0.2/0.1 g) | 10 g |
| 2 | 11 g/5 g | 3 phr (0.48 g) | 2/1/1 (0.24/0.12/1.12 g) | 10 g |
| 3 | 11 g/5 g | 3.5 phr (0.56 g) | 1/1/1 (0.19/0.19/0.19 g) | 10 g |
| 4 | 8 g/8 g | 2.5 phr (0.4 g) | 1/2/1 (0.1 g/0.2 g/0.1 g) | 10 g |
| 5 | 8 g/8 g | 3 phr (0.48 g) | 2/1/1 (0.24/0.12/1.12 g) | 10 g |
| 6 | 8 g/8 g | 3.5 phr (0.56 g) | 1/1/1 (0.19/0.19/0.19 g) | 10 g |
| 7 | 6 g/10 g | 2.5 phr (0.4 g) | 1/2/1 (0.1 g/0.2 g/0.1 g) | 10 g |
| 8 | 6 g/10 g | 3 phr (0.48 g) | 2/1/1 (0.24/0.12/1.12 g) | 10 g |
| 9 | 6 g/10 g | 3.5 phr (0.56 g) | 1/1/1 (0.19/0.19/0.19 g) | 10 g |

The coated films obtained from Examples 1-9 were visually evaluated for appearance. No streaky appearance was found except for Example 3, which had about 10% streaky surface area.

The slurry of Example 6 was fabricated into a 80 μm thick test specimen by a precision coating apparatus as in FIG. 2. The test specimens were measured for characteristics including moisture permeability, transmittance, hardness, surface roughness, water contact angle, and so on. The results of measurement are listed in Table 2 below, and the characteristics of conventional TAC film are also listed for comparative purposes.

TABLE 2

|  | Epoxy/silica composite | TAC |
|---|---|---|
| Thickness (μm) | 80 | 80 |
| Specific gravity | 1.32 | 1.10 |
| Moisture permeability (g/m$^2$/24 hr) | 15-20 | 300-380 |
| refractive index | 1.50 | 1.50 |
| Optical retardation value (nm) | 2.7 | <3 |
| Transmittance (%) | 91 | 92 |
| Tg (° C.) | 110-120 | 150-155 |
| Coefficient of Thermal expansion (ppm/° C.) | 80-90 | 65-75 |
| hardness | 3H | HB |
| Surface roughness (Å) | 5-10Å | <9.4Å |
| Water contact angle after corona treatment | 14° | 35-40° |

The results in Table 2 show that the composite film of the invention were improved in terms of moisture permeability, hardness, and water contact angle compared to that of conventional TAC film. Other characteristics required for polarizer protective film, such as transmittance, birefringence, surface roughness were sufficiently presented therein.

While the invention has been particularly shown and described in terms of preferred embodiment, it will be understood by those skilled in the art that various changes in form and details may be made without departing from the spirit and scope of the invention.

What is claimed is:

1. A polarizer protective film, comprising:
   a transparent resin; and
   about 5-50% by weight of nanoscale particles dispersed in the transparent resin, wherein the nanoscale particles are formed of a single material and have an average diameter not exceeding 50 nanometers,
   wherein the combination of the transparent resin and the nanoscale particles exhibits an optical retardation value of less than 5 nm, and
   wherein the polarizer protective film is formed of a single layer and directly touches a polarizer.

2. The polarizer protective film as claimed in claim 1, wherein the transparent resin comprises a cross-linked polymer.

3. The polarizer protective film as claimed in claim 1, wherein the transparent resin comprises a UV-cured polymer, a thermal-cured polymer, or a combination thereof.

4. The polarizer protective film as claimed in claim 1, wherein the transparent resin comprises one or more epoxy resins, or one or more acrylic resins, or combinations thereof.

5. The polarizer protective film as claimed in claim 1, wherein the transparent resin has a glass transition temperature of about 100-200° C.

6. The polarizer protective film as claimed in claim 1, wherein the nanoscale particles comprise particles of silica, metal oxide, or a combination thereof.

7. The polarizer protective film as claimed in claim 1, further comprising at least one of UV absorber and an antioxidant.

8. The polarizer protective film as claimed in claim 1, further having a transmittance of not less than 90%.

9. The polarizer protective film as claimed in claim 1, further exhibiting a film hardness of not less than 3H.

10. The polarizer protective film as claimed in claim 1, further being surface treated and exhibiting a water contact angle of less than 15°.

11. A polarizing plate comprising a polarizer and a polarizer protective film according to claim 1 provided on at least one surface of the polarizer.

12. The polarizing plate as claimed in claim 11, further being free of a hard coat layer on the polarizer protective film.

13. A visual display comprising a polarizing plate according to claim 12.

14. The visual display as claimed in claim 13, wherein the visual display is a liquid crystal display.

15. The polarizing plate as claimed in claim 11, wherein the polarizer protective film is provided on opposite surfaces of the polarizer.

16. The polarizing plate as claimed in claim 11, wherein the polarizer protective film has a thickness of about 20-80 μm.

17. A polarizer protective film, comprising:
a transparent resin comprising a cross-linked epoxy or acrylic polymer; and
5-50% by weight of nanoscale silica particles dispersed in the transparent resin, wherein the nanoscale silica particles are formed of a single material and have an average diameter of not exceeding 50 nanometers,
wherein the combination of the transparent resin and the nanoscale silica particles exhibits a transmittance not less than 90%, a film hardness not less than 3H, and an optical retardation value of less than 5 nm, and
wherein the polarizer protective film is formed of a single layer and directly touches a polarizer.

18. The polarizer protective film as claimed in claim 17, wherein the transparent resin has a glass transition temperature of about 100-200° C.

19. The polarizer protective film as claimed in claim 17, further being surface treated and exhibiting a water contact angle of not more than 15°.

* * * * *